W. J. PLOGSTED.
CROSS PROTECTION DEVICE.
APPLICATION FILED AUG. 30, 1911.
1,163,171. Patented Dec. 7, 1915.
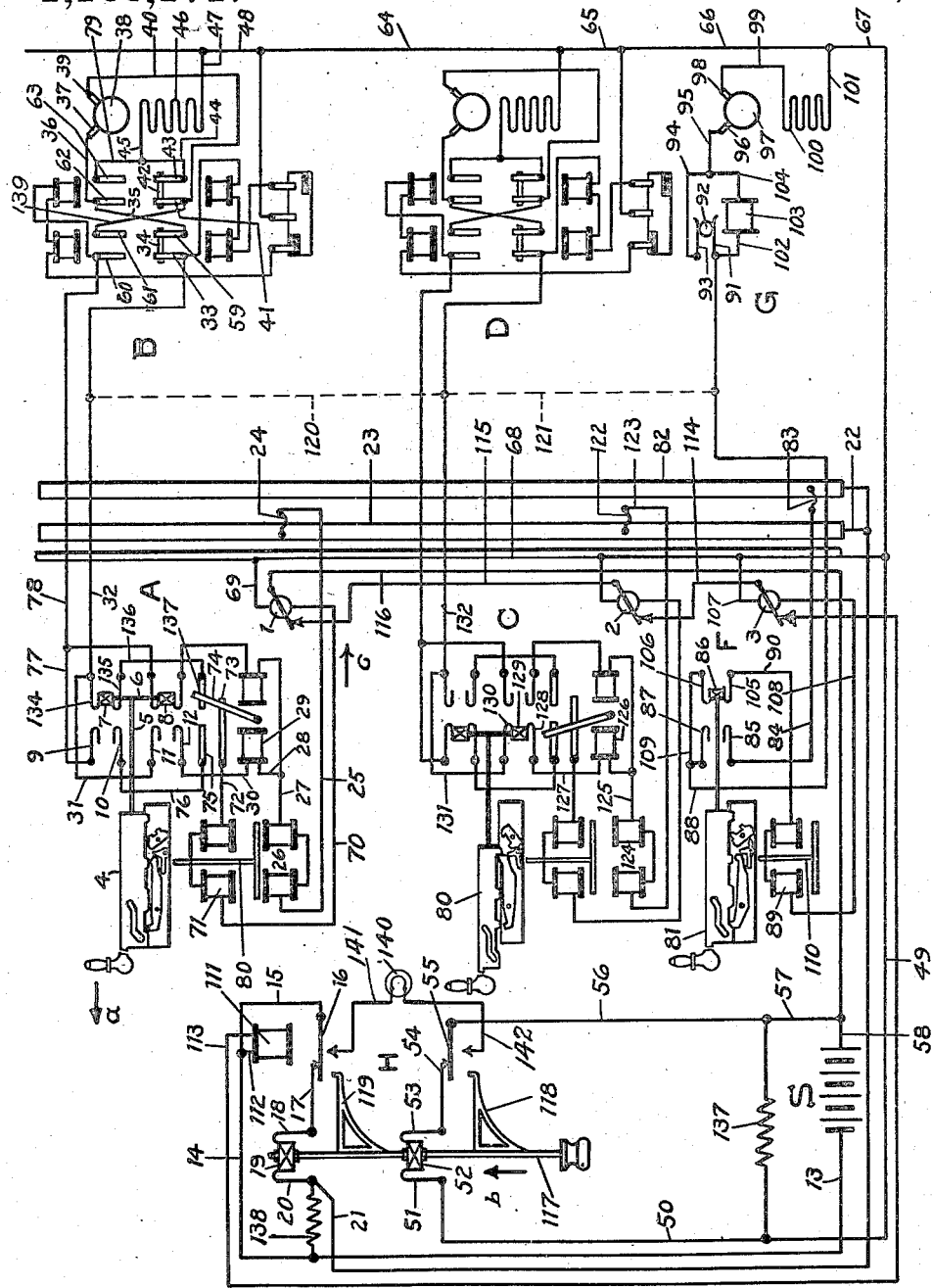
WITNESSES:
George T. Whitney
Eugene G. Edwards
INVENTOR
Walter J. Plogsted
BY
Lyman E. Dodge
ATTORNEY

UNITED STATES PATENT OFFICE.

WALTER J. PLOGSTED, OF YONKERS, NEW YORK, ASSIGNOR TO GENERAL RAILWAY SIGNAL COMPANY, OF GATES, N. Y., A CORPORATION OF NEW YORK.

CROSS PROTECTION DEVICE.

1,163,171.   Specification of Letters Patent.   Patented Dec. 7, 1915.

Application filed August 30, 1911. Serial No. 646,829.

*To all whom it may concern:*

Be it known that I, WALTER J. PLOGSTED, a citizen of the United States, and resident of Yonkers, Westchester county, and State of New York, have invented a new and useful Cross Protection Device, of which the following is a specification.

This invention relates to a protective device and more particularly to a protective device adapted for use in connection with a system of power operated interlocked switches and signals.

One of the main objects of this invention is to so arrange a protective device in connection with a system of power operated interlocked switches and signals, that a cross between an energized control wire and the next operative control wire of a switch or signal will cause the positive and negative bus bars of the interlocking machine to become disconnected from the battery or other source of energy and will maintain the circuit from the source of energy to the positive and negative bus bars open, until the cross has been removed. It is to be observed that this object can not be attained, if it lies within the power of the manipulator of the switches or signals to so interfere with the operation of the protective device that the positive and negative bus bars may be connected to the source of energy before the removal of the cross, consequently, in this protective device are embodied means which prevent such improper manual operation of it. It is also to be observed that the object above stated cannot be obtained if it lies within the power of the manipulator of the switches or signals to hold or move the protective device or any part of it before a cross has actually occurred, into such a position that the protective device is rendered inoperative.

A further object of this invention is to arrange a protective device upon the so called "closed circuit" principle so that a break in any of the connections associated with the protective device will result in such an operation that an immediate notification will be received.

In the accompanying drawing comprising a single figure in which like reference characters denote like parts, has been delineated diagrammatically the circuits and devices appropriate to a full explanation of the invention.

A, designates generally the lever and associated mechanism by means of which the switch mechanism designated generally by B, is caused to operate; C, designates another lever and associated mechanism by which the switch mechanism designated generally by D, is caused to operate, and F, designates generally a lever and associated mechanism by which the signal mechanism denoted generally by G, is caused to operate. The protective device is designated generally by H, and the source of energy by S.

The groups designated by A, C and F, are old and well known devices in common use and are fully shown, described and claimed in patents to Taylor 605,359, June 7, 1898; 752,127 February 16, 1904 and 832,175 October 2, 1906. The groups of mechanism designated by B, D and G, are old and well known devices in common use and are fully shown, described and claimed in the patents to Taylor 605,359 June 7, 1898 and 800,246 September 26, 1905.

1, 2 and 3 designate polarized magnets, the function of which is fully described in the patent to Taylor 821,385 May 22, 1906.

The operation of a switch, according to this system, is as follows: Lever 4, upon being moved in the direction of the arrow $a$, would carry with it the bar 5 and the cross bar 6 which carries upon either end the contacting blocks 7 and 8, which, upon a movement of the lever to the reverse operating and indicating position, will connect the springs 9 and 10 and 11 and 12, so that current from the main battery S may flow in the following circuit: wire 13, wire 14, wire 15, armature 16, wire 17, spring 18, block 19, spring 20, wire 21, wire 22, to the positive switch bus bar 23, then by means of fuse 24 to wire 25, safety magnet 26, wire 27, wire 28, indication selector coil 29, wire 30, spring 12, block 8, spring 11, wire 31, wire 32, pole changer spring 33, movable contact 34, spring 59, wire 35, wire 36, brush 37, armature 38, brush 39, wire 40, spring 41, contact strip 42, brush 43, wire 44, wire 45, field 46, wire 47, wire 48, wire 64, wire 65, wire 66, wire 67, wire 49, wire 50, brush 51, contact block 52, brush 53, wire 54, relay armature 55, wire 56, wire 57 and wire 58 to the other terminal of the battery S. The current in the above traced path would cause the motor armature 38 to revolve and so cause the switch connected thereto to be thrown to the reverse position. In so doing the conducting strips 34 and 42 would in the well known manner be moved from in contact with springs 33 and 59 and 41 and 43 so as to make contact with springs 60 and 61 and 62 and 63 and that after the motor had rotated sufficiently to throw the switch to the reverse position, it would continue to rotate by the acquired momentum and thus generate a current which, on account of the changed position of the conducting strips 34 and 42 and the fact that arm 74 was moved into a position making contact with strip 75, when the operating current first began to flow, which generated current would flow in the following path: brush 37, wire 36, strip 62, contact strip 42, spring 63, wire 79, wire 45, field 46, wire 47, wire 48, wire 64, wire 65, wire 66, wire 67, indication bus 68, wire 69, the coil of polarized relay 1, wire 70, indication magnet 71, wire 72, spring 73, arm 74, spring 75, wire 76, spring 10, contact block 7, spring 9, wire 77, wire 78, spring 60, contact strip 34, spring 61, wire 139, wire 40, to the other brush of the motor whose armature is 38, thus completing the circuit. The current in the above traced path is called the indication current and actuates rod 80 to release the lever 4 in the well known manner, so that it may complete its full stroke to the reverse position. The group of mechanisms described by C acting upon the group of mechanisms designated by D, act in exactly the same manner.

When lever 81 is reversed, current flows from the signal bus bar 82 through the fuse 83, wire 84, brush 85, block 86, brush 87, wire 88, to spring 91, through contact block 92, spring 93, wire 94, wire 95, brush 96, armature 97, brush 98, wire 99, field 100, wire 101, wire 67, wire 49, wire 50, brush 51, block 52, brush 53, wire 54, armature 55, wire 56, wire 57, and wire 58 to the negative terminal of the battery. The current flowing in the above traced path causes the armature 97 to revolve and move the signal to the clear position in a manner well understood, and when the signal reaches the clear position, the block 92 moves from in contact with springs 91 and 93, so that the current which formerly passed through said block is caused to pass by wire 102, brake magnet 103, to wire 104 and so to wire 95 and through the motor and back to the negative terminal of the battery, so that the signal is held in the clear position by the consumption of less current than is needed to move it to the clear position. Upon returning the lever to normal position, the block 86 makes contact with springs 105, and 106, and the motor being driven backwardly by the normal bias of the blade generates a current which flows from brush 98, through wire 99, field 100, wire 101, wire 67, indication bus 68, wire 107, coil on polarized relay 3, wire 108, indication magnet 89, wire 90, spring 105, block 86, spring 106, wire 109, wire 88, spring 91, block 92, spring 93, wire 94 and wire 95 to the other terminal of the motor 96, thus completing the circuit. The current flowing in the above traced path and generated by the revolution of the motor backwardly as the signal goes to danger, causes the rod 110 to be moved by indication magnet 89 thus releasing the lever at the normal indication point and allowing the lever to be moved to the full normal.

It is to be observed that the positive bus bars 23 and 82 are connected to the positive side of the battery through the armature 16, and the contact block 19, consequently, both must be in the position shown in order to have positive current reach the positive bus bar. It is also to be observed that the return wire from the functions, reaches the negative side of the battery through block 52 and relay armature 55, so that both block 52 and armature 55 must be in the position shown in order to afford a return path to the battery. Armatures 16 and 55 are controlled by relay 111, the control circuit of the relay being as follows:—battery S, wire 13, wire 14, wire 112, wire 113, armature of polarized relay 3, wire 114, armature of polarized relay 2, wire 115, armature of polarized relay 1, wire 116, wire 58 to the negative terminal of the battery. It is thus evident that the armatures of polarized relays 1, 2 and 3 must be in the position shown in order to have a complete circuit through the magnet of 111, so that it will hold the armatures 16 and 55 in the position shown. The conducting blocks 19 and 52 are governed by the rod 117, which may be reciprocated by hand and when moved in the direction of the arrow b causes the arms 118 and 119 to contact with armatures 55 and 16 respectively and to move them into the position shown, so that they may be held in such position by the magnet 111, for the armatures are allowed to drop so far away from the poles when the magnet 111 is deënergized that upon a subsequent energization of magnet 111 it is not capable of moving them until they have been moved within the zone of its influence by means of arms 118 and 119. It is necessary, however, to move rod 117 so far in the direction of the arrow b in moving armatures 55 and 16 within the zone of influence of magnet 111, that blocks 19 and 52 break contact with springs 18 and 20 and 53 and 51, so that it is necessary after moving armatures 16 and 55 into the zone of influence of magnet 111 to draw rod 117 in a direction contrary to the direction of the arrow b in order that blocks 19 and 52 will make contact with springs 18 and 20 and 51 and 53. On account of such construction after armatures 16 and 55 have been dropped by deënergization of magnet 111, it is necessary for the operator, as all of the parts are inclosed in a locked case, having merely the rod 117 extending therefrom, to actually break the connections of the battery to the positive bus bars and to the return wire before he can restore the break caused by the dropping of the armatures 16 and 55, so that it would be impossible for him to restore armatures 16 and 55 and hold them restored by tying the rod 117 in its inner position and still be able to operate any of the functions, for under such conditions the positive bus bars would be disconnected as would also the return wire from the functions on account of the displacement of the blocks 19 and 52.

The relay 111 governs the armatures 16 and 55, and is in turn governed by the armatures of the polarized relays 1, 2 and 3, which as fully shown, described and claimed in the patent to Taylor 821,385, May 22, 1906, are so connected that a current in the direction of the arrow c, will cause the armatures to break contact with the points, thus breaking the current through the relay 111 and causing the armatures 16 and 55 to drop thus cutting off positive current from all functions.

Dotted lines 120 and 121, indicate possible crosses so that when lever 80 is in the reverse position as shown, positive current from the battery S would flow through wire 13, wire 14, wire 15, armature 16, wire 17, spring 18, block 19, spring 20, spring 21, switch bus 23, fuse 122, wire 123, safety magnet 124, wire 125, indication selector 126, wire 127, spring 128, contact block 129, spring 130, wire 131, wire 132, to the dotted lines 120 and 121. It would then flow by means of conducting path 120 to wire 32, spring 134, block 7, spring 135, wire 136, spring 137, arm 74, spring 73, wire 72, indication magnet 71, wire 70, coil of polarized relay 1, wire 69, indication bus 68, wire 49, wire 50, spring 51, block 52, spring 53, wire 54, armature 55, wire 56, wire 57, wire 58, to the negative terminal of the battery. The current which flowed along conducting path 120 might also flow in the other direction along the wire 32 and act just exactly as a current sent out on the reverse control wire and when the lever 4 was normal might operate the switch mechanism B to move it to the reverse position which is the danger which is to be avoided, but by making the first designated path through the indication magnet of less resistance than the path through the motor, the great bulk of the current will flow through the indication magnet and also through the polarized magnet 1, but in a direction to move the armature from in contact with its point, thus breaking the circuit of the magnet 111 and immediately causing armatures 16 and 55 to drop, thus cutting off current from all functions and preventing a movement of any function until the cross has been removed, and immediately notifying the operator of the improper flow of current by lighting the lamp 140, by reason of a circuit in which current flows as follows: commencing at the battery S, wires 13, 14 and 15, armature 16 in its lower position, wire 141, lamp 140, wire 142, armature 55 in its lower position and wires 56, 57 and 58 back to the battery S.

The current flowing in wire 132, under the above described conditions, might also flow along conducting path 121 and so through wire 88, wire 109, spring 106, block 86, spring 105, wire 90, indication magnet 89, wire 108, polarized magnet 3, by wire 107 to the indication bus 68, and so back to the negative terminal of the battery, but as it is flowing in a direction contrary to that which it should to hold the relay contact closed, it will cause the armature of the relay to break contact and so break the circuit of the magnet 111, thus causing positive current to be cut off from positive bus bars 23 and 82 and so prevent the movement of any function until the cross has been removed. As long as the cross remains, relay 111 will be deënergized, consequently armatures 16 and 55 will be in the lower position, consequently the positive current from the battery can not reach the positive bus bars, and even if the armatures are moved in their upper position as shown by movement of plunger 117, the circuit between the battery and the positive bus will be broken by the displacement of blocks 19 and 52.

In case it is not desired to have the signals go to danger upon the breaking of the connection between the positive side of battery and the positive bus bars, the resistances 137 and 138 may be inserted between the common return wire and the negative side of battery and positive side of battery and the wire 21 connecting the spring 20 with the positive bus bars so that even if current is cut off from the positive bus bars, sufficient current may flow through the resistances 137 and 138 to maintain the signals in the proceed position. These resistances are of such value that the signal mechanisms will not operate through them.

It is to be observed that the circuit including the electro-magnet 111 is normally closed, therefore any break in any of the connections or wires concerned will immediately result in disconnecting both sides of the battery from the functions. This is an extremely important feature, for, a protective device must, in order to be perfectly reliable and trustworthy, render inoperative the system which it protects upon the occurrence of any defect whereby it is rendered impossible to perform its functions, thereby giving immediate notification of its derangement.

The device herein shown and described, unlike other devices of its class, is so arranged that it is impossible to destroy the protective feature by any manipulation of the only exposed part of the device, namely the rod 117 prior to the existence of a cross in the system. This function is obtained by providing that all current to the functions will be cut off upon an operation of the rod 117 in the direction of the arrow *b*, so that, if the operator attempts to prevent the dropping of armatures 16 and 55 by moving the rod 117 in the direction of the arrow *b* and fastening it in such position, he will then be prevented from operating any function.

Although applicant has herein shown and described his protective device as adapted to break both the connection to the negative and positive side of the battery, it is to be understood that although the full value of the invention is only thereby obtained, useful and important results will be obtained if the connection from one side of the battery only is broken through the protective device, and it is to be understood that applicant considers that the breaking of a connection from one side of the battery only, lies well within his idea of means.

Having thus explained the principle of my invention and described a particular specific embodiment thereof, what I claim as new and desire to secure by Letters Patent, is:

1. In an electric interlocking system for switches and signals, operating wires, a source of current, means forming a connection from the source of current to the operating wires, and means for breaking said connection when an operating wire carrying current is crossed with an operating wire not carrying current, and means for preventing the making of said connection until said cross is removed.

2. In an electric interlocking system for switches and signals, switch and signal operating means, a source of current, control wires for connection at times to said source of current, means to interrupt said connection when the next operative control wire of a switch or signal receives current from other than the normal path, and means to prevent the closing of said connection until said next operative control wire ceases to receive current from other than the normal path.

3. In an electric interlocking system for switches and signals: operating wires; a source of current; a signaling device connected to one end of one of the operating wires; a protective relay; a conducting path from the source of current to the operating wires including an operating circuit controller, a manually operable circuit controller and an armature of the protective relay; a conducting path from the source of current to the signaling device including another armature of the said protective relay; means for causing the protective relay to be normally energized, thus causing the armatures to form part of the said conducting paths, said means operable by a flow of current to an operating wire not then connected to the source through the operating circuit controller to cause a deënergization of the protective relay, thus allowing the dropping of its armatures and causing the breaking of the said conducting paths.

4. In an electric interlocking system for switches and signals: operating wires; a source of current; a signaling device connected to one end of one of the operating wires; a protective relay; a conducting path from the source of current to the operating wires including an operating circuit controller, a manually operable circuit controller and an armature of the protective relay; a conducting path from the source of current to the signaling device including another armature of the said protective relay; means for causing the protective relay to be normally energized, thus causing the armatures to form part of the said conducting paths, said means operable by a flow of current to an operating wire not then connected to the source through the operating circuit controller to cause a reënergization of the protective relay, thus allowing the dropping of its armatures and causing the breaking of the said conducting paths; means connected to said manually operable circuit controller for causing a replacement of the armatures of said relay when the controller is operated to break the circuit therethrough thus preventing the completion of the conducting path until the said flow of current has ceased.

5. In an electric interlocking system for switches and signals: operating wires; a source of current; a signaling device connected to one end of one of the operating wires; a protective relay; a conducting path from the source of current to the operating wires including an operating circuit controller, a manually operable circuit controller and an armature of the protective relay; a conducting path from the source of current to the signaling device including another armature of the said protective relay; means for causing the protective relay to be normally energized thus causing the armatures to form part of the said conducting paths, said means operable by a flow of current to an operating wire not then connected to the source through the operating circuit controller to cause a deënergization of the protective relay, thus allowing the dropping of its armatures and causing the breaking of the said conducting paths; means connected to said manually operable circuit controller for causing a replacement of the armatures of said relay when the controller is operated to break the circuit therethrough thus preventing the completion of the conducting path until the said flow of current has ceased; a signal; and means for actuating said signal by the deënergization of said relay.

6. In an electric interlocking system for switches and signals: operating wires; a source of current; means forming a connection from the source of current to the operating wires, including a manually operable circuit controller; means for breaking said connection when an operating wire in which current should not then be flowing has current improperly supplied thereto; means operated by the manually operable circuit controller for closing the break in said connection, said manually operable circuit controller simultaneously causing another break in said connection, the last named break remaining until the manually operable circuit controller is restored to normal position.

7. In an electric interlocking system for switches and signals: operating wires; a source of current; means forming a connection from the source of current to the operating wires, including a manually operable circuit controller normally completing said circuit; means for breaking said connection when an operating wire in which current should not then be flowing has current improperly supplied thereto; means operated simultaneously with said circuit controller for closing said break; and a high resistance shunt around said circuit controller and the second named means allowing some flow of current when the connection from the source to the operating wires is broken by said last two mentioned means.

8. In an electric interlocking system; a function; a source of current; operating wires; means for connecting the source of current through the operating wires with the function; a return connection from the function to the source of current; means for breaking said return connection when current from the source flows improperly to an operating wire; and means for preventing the manual making of said return connection until the improper flow of current ceases.

9. In an electric interlocking system, in combination: a source of current; an electrically operated function; a return connection from said function to said source of current; a circuit controlling lever for governing the movements of said function; a circuit which is closed when said lever and said function are at rest and which is normally disconnected from said source of current; electromagnetic means operated to break said return connection when improper connections permit current to flow from said source in said circuit; means for restoring said electromagnetic means to its normal position in which the break in said return connection is closed; and means for preventing the continuity of said return connection from being permanently established until said improper connections are broken and said flow of current ceases to exist.

10. In an electric interlocking system, in combination: a source of current; an electrically operated function; a return connection from said function to said source of current; a conductor connected to said return connection; operating wires for carrying current from said source to said function; a manually operable circuit controlling lever for governing the movements of said function and arranged to connect said operating wires alternately one at a time to said source of current and to said conductor respectively; electromagnetic means operated by a flow of current in said conductor in a certain direction for interrupting the normal continuity of said return connection; means for restoring said electromagnetic means to its normal position; and means operated by the restoring movement of said last-mentioned means for breaking said return connection at another point.

11. In an electric interlocking system, in combination: a source of current; an electrically operated function; operating wires for carrying current from said source to said function; a manually operable circuit controlling lever for governing the movements of said function; a circuit including said function and said lever which is closed when said function and said lever are at rest; electromagnetic means operated by a flow of current in said circuit in a certain direction to break the connection from said source of current to said lever; means for placing said electromagnetic means in position to close said break; and a circuit breaker having its contacts arranged in series with said break, said circuit breaker being operatively connected to said restoring means and being opened when said restoring means is operated and being closed when said restoring means is returned to its normal position to release said electromagnetic means.

WALTER J. PLOGSTED.

Witnesses:
E. E. SAWYER,
W. S. BURROWS.